B. F. FOWLER.
DEVICE FOR BEATING EGGS AND WHIPPING CREAM.
APPLICATION FILED AUG. 19, 1909.
966,738.
Patented Aug. 9, 1910.
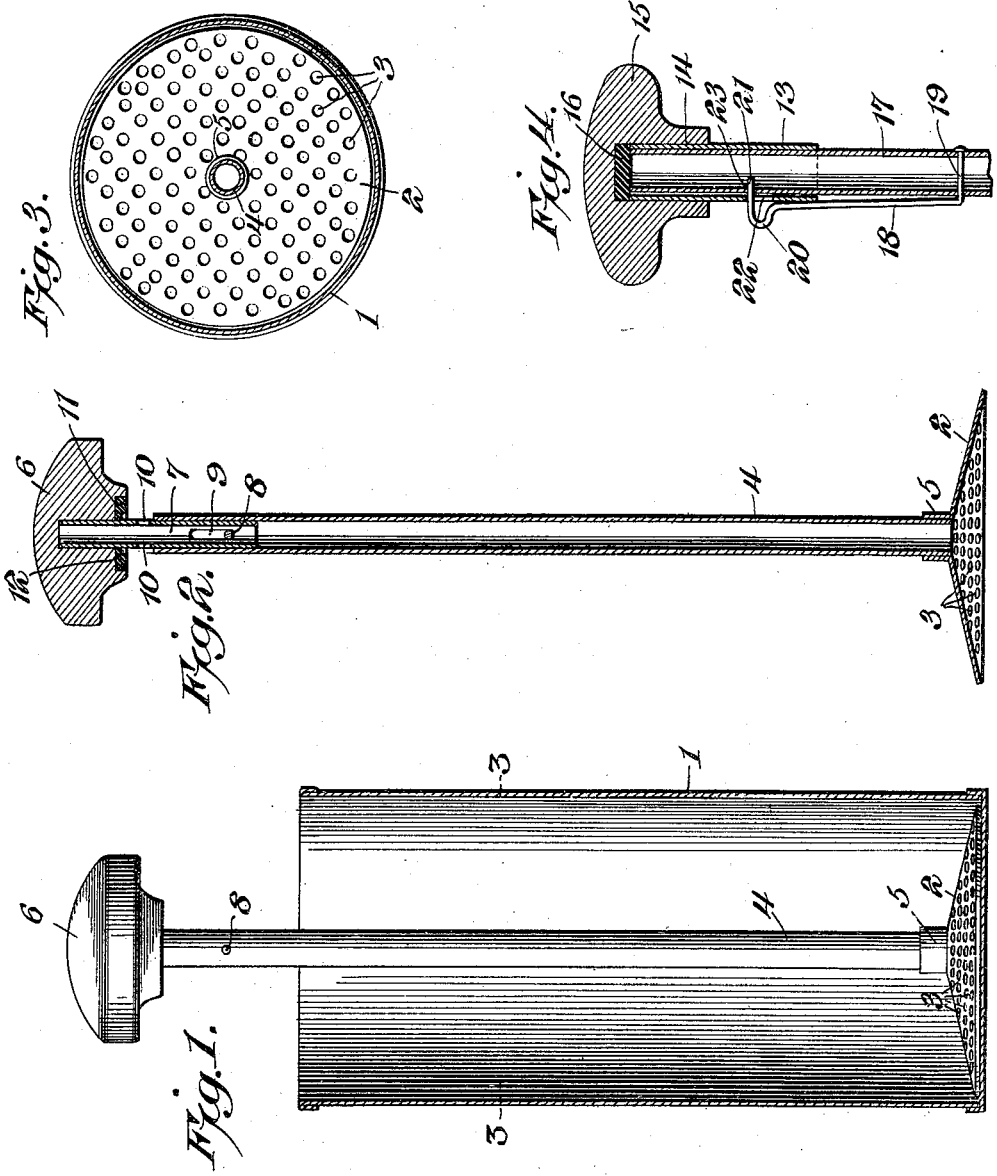
Benjamin F. Fowler, Inventor,
Witnesses

UNITED STATES PATENT OFFICE.

BENJAMIN F. FOWLER, OF MINNEAPOLIS, MINNESOTA, ASSIGNOR, BY MESNE ASSIGNMENTS, TO CHARLES E. VAN DUZEE, OF MINNEAPOLIS, MINNESOTA.

DEVICE FOR BEATING EGGS AND WHIPPING CREAM.

966,738.  Specification of Letters Patent.  Patented Aug. 9, 1910.

Application filed August 19, 1909. Serial No. 513,582.

*To all whom it may concern:*

Be it known that I, BENJAMIN F. FOWLER, a citizen of the United States, residing at Minneapolis, in the county of Hennepin and State of Minnesota, have invented a new and useful Device for Beating Eggs and Whipping Cream, of which the following is a specification.

The invention relates to a device for beating eggs and whipping cream.

The object of the present invention is to improve the construction of devices for beating eggs and whipping cream, and to provide a simple, inexpensive and efficient egg beater and cream whipper, equipped with an air valve adapted to close on the down stroke and open on the up stroke, whereby air will be forced through the material operated on to facilitate the beating of the eggs and the whipping of the cream and similar operations.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a vertical sectional view of an egg beater and cream whipper, constructed in accordance with this invention, the dasher being shown in elevation. Fig. 2 is a vertical sectional view of the dasher. Fig. 3 is a horizontal sectional view on the line 3—3 of Fig. 1. Fig. 4 is a detail sectional view, illustrating another form of the invention.

Like numerals of reference designate corresponding parts in all the figures of the drawing.

The device for beating eggs and whipping cream is equipped with a dasher operating within a cylindrical receptacle 1, and provided with a slightly concavo-convex head 2, having perforations 3 and secured to the lower end of a tubular stem 4. The lower end of the tubular stem 4 is preferably secured within a sleeve 5 of the dasher head, but it may be attached to the latter in any other desired manner. The upper end of the tubular stem 4 is connected with a knob or handle 6 by means of a short inner tube 7, telescoping within the outer tube and secured at its upper end to the knob or handle and having a limited movement with respect to the tubular stem, such relative slidable movement of the inner and outer tubes on each other being limited by a transverse pin 8, secured to the outer tube and operating in a longitudinal slot 9 of the inner tube. The inner tube is provided a short distance below the handle or knob with openings 10, which are uncovered or exposed on the up-stroke to permit the entrance of air. On the down stroke the openings 10 are automatically covered to prevent the escape of air, which is forced through the substance operated on, thereby aerating the substance operated on and facilitating the beating of the eggs, the whipping of the cream and the performance of similar operations. The knob or handle is provided at its lower face with a packing 11 of rubber or other suitable material, seated within the knob or handle and arranged to be engaged by the upper edge of the tubular stem, whereby an air tight closure of the upper end of the stem is effected. The tubular stem is open at both ends and on the down stroke when the upper end of the stem is closed by the packing, the material operated on, splashing into the lower end of the tube, displaces a quantity of air, which passes through the contents of the receptacle and, as the tubular stem is cushioned in its reciprocation by the packing, the hand of the operator is relieved to some extent of jar. The packing is preferably provided in its lower face with a recess 12 into which the upper end of the tubular stem extends on the down stroke of the dasher. The short tube, which is slidably connected with the tubular stem of the dasher, has its upper end suitably secured within a socket or opening of the knob or handle.

Instead of arranging the short tube within the tubular stem, as illustrated in Figs. 1 and 2 of the drawing, it may be arranged on the exterior of the stem of the dasher, as shown in Fig. 4. In this embodiment of the invention, the short tube 13 is secured within a socket 14 of the knob or handle 15, a packing 16 being first introduced into the socket 14. The tubular stem 17 telescopes within the short tube and is arranged to engage the packing to close its upper end. Sufficient space is provided between the tubes to permit the entrance of air on the up-stroke, when the knob or handle is raised out of contact with the upper end of the stem of the dasher. The short tube is detachably secured on the upper end of the stem of the dasher by means of a resilient catch 18, constructed of spring wire, or other suitable material and consisting of a stem having its lower terminal portion bent at right angles and extended through the tubular stem forming a transverse fastening device 19. The upper portion of the stem is bent outward to form a loop 20, and the upper terminal 21 is extended inwardly through a slot 22 of the outer tube and through a perforation 23 of the inner tube or stem. The slot 22 limits the relative movement of the inner and outer tubes similar to the transverse fastening device 8, heretofore described.

Having thus fully described my invention, what I claim as new and desire to secure by Letters Patent, is:—

1. A device of the class described provided with a dasher including a tubular stem, a handle, a short tube secured to the handle and slidably connected with the tubular stem, one of the tubular parts being provided with an opening, which is covered and uncovered by the other tubular part, said handle being arranged to close the upper end of the stem on the down-stroke to prevent the escape of air and movable away from the same on the up-stroke to permit the entrance of air.

2. A device of the class described provided with a dasher including a tubular stem open at each end, a handle, a short tube fixed at its upper end to the handle and slidably fitting the tubular stem, said handle forming a closure for the short tube and being provided with a packing arranged to close the upper end of the stem on the down-stroke to prevent the escape of air and movable away from the same on the up-stroke to permit the entrance of air, said packing also forming a cushion for the tubular stem.

3. A device of the class described provided with a dasher including a tubular stem, a handle, a short tube secured to the handle and slidably fitting the tubular stem and provided in its lower portion with a longitudinal slot and having an opening in its upper portion arranged to be covered and uncovered by the tubular stem on the down-stroke and up-stroke of the dasher, means carried by the tubular stem and operating in the slot of the inner tube to limit the relative movement of the stem and the said inner tube, and a packing mounted on the handle and arranged to be engaged by the upper end of the tubular stem to form a tight closure for the same.

In testimony, that I claim the foregoing as my own, I have hereto affixed my signature in the presence of two witnesses.

BENJAMIN F. FOWLER.

Witnesses:
    A. Manthey,
    R. W. Gross.